(12) United States Patent
Schultz et al.

(10) Patent No.: US 8,608,135 B2
(45) Date of Patent: Dec. 17, 2013

(54) CARBURETOR AIR INTAKE HOUSING AND AIR FLOW ENHANCING SECUREMENT PLATE

(75) Inventors: Carl W. Schultz, Twin Lakes, WI (US);
Timothy G. Ormiston, Twin Lakes, WI (US)

(73) Assignee: Five Star Fabricating, Inc., Twin Lakes, WI (US)

( * ) Notice: Subject to any disclaimer, the term of this patent is extended or adjusted under 35 U.S.C. 154(b) by 88 days.

(21) Appl. No.: 13/374,038

(22) Filed: Dec. 8, 2011

(65) Prior Publication Data

US 2013/0147069 A1    Jun. 13, 2013

(51) Int. Cl.
*F02M 17/34*    (2006.01)

(52) U.S. Cl.
USPC ............... 261/23.2; 55/385.3; 55/DIG. 28; 261/64.1

(58) Field of Classification Search
USPC ............ 261/23.2, 64.1, 109; 55/385.3, 385.7, 55/DIG. 28; 123/184.21, 195 C, 195 E, 123/198 E
See application file for complete search history.

(56) References Cited

U.S. PATENT DOCUMENTS

| | | | | |
|---|---|---|---|---|
| 3,906,724 A * | 9/1975 | Yoshizaki | | 60/305 |
| 4,066,720 A | 1/1978 | Carter | | |
| 4,300,928 A * | 11/1981 | Sugie et al. | | 55/385.1 |
| 4,375,798 A * | 3/1983 | Garretson | | 123/525 |
| 4,406,259 A * | 9/1983 | Van Etten | | 123/198 R |
| 4,415,507 A * | 11/1983 | Voliva | | 261/18.3 |
| 4,802,902 A * | 2/1989 | Bauerle et al. | | 55/484 |
| 4,834,784 A * | 5/1989 | Bidanset | | 55/385.7 |
| 4,971,730 A | 11/1990 | Edmonston | | |
| 5,308,554 A | 5/1994 | Edmonston | | |
| 5,342,555 A | 8/1994 | Edmonston | | |
| 5,732,686 A | 3/1998 | Yokoyama et al. | | |
| 5,809,972 A * | 9/1998 | Grant | | 123/478 |
| 6,371,068 B2 | 4/2002 | Taylor | | |
| 6,478,288 B1 * | 11/2002 | Duncan | | 261/23.2 |
| 6,780,214 B2 | 8/2004 | Leibold | | |
| 7,025,799 B2 * | 4/2006 | Peterson | | 55/385.3 |
| 7,114,476 B1 | 10/2006 | Wimmer | | |
| 7,121,533 B2 * | 10/2006 | Warfel et al. | | 261/71 |
| 7,255,331 B2 | 8/2007 | Grant | | |
| 2007/0074452 A1 * | 4/2007 | Yates | | 48/144 |

FOREIGN PATENT DOCUMENTS

JP    6-108885 A  *  4/1994

* cited by examiner

*Primary Examiner* — Richard L Chiesa
(74) *Attorney, Agent, or Firm* — Jeffrey S. Sokol (57) ABSTRACT

An air intake housing and flow enhancing plate for a carburetor with a fluted and contoured air intake opening that flushly aligns with and matches the shape of the carburetor air intake opening. The low profile plate is made of metal for durability and heat resistance. The centrally located air intake opening of the plate has a clover leaf or undulating shape that conforms to the shape of the carburetor air intake opening. The plate is secured directly over the top of the carburetor, and extends radially outward to provide a larger area for securing its fiberglass housing. The housing holds a conventional ring shaped air filter located around the carburetor air intake opening. The plate provides smooth transitions between surfaces to decrease turbulence and improve air flow.

15 Claims, 10 Drawing Sheets

CARBURETOR AIR INTAKE HOUSING AND AIR FLOW ENHANCING SECUREMENT PLATE

TECHNICAL FIELD OF THE INVENTION

This invention pertains to a metal plate for securing a fiberglass air intake housing over a contoured carburetor air intake opening, where the air intake opening of the plate is contoured to match the shape of the carburetor intake opening and is also fluted to thereby improve air flow into the carburetor and engine performance.

BACKGROUND OF THE INVENTION

The carburetor of an internal combustion engine controls the air and fuel mixture entering the cylinders of the engine for ignition. Obtaining a desired fuel-to-air ratio helps the engine operate more efficiently and produce more power. Engine power can be increased by increasing the amount of fuel entering each cylinder. However, simply increasing the amount of fuel to increase power is not enough. Problems occur when the fuel-to-air ratio is too "rich" or too "lean."

Increasing air flow into the carburetor to mix with the fuel is often problematic, particularly in racecar applications. The air intake opening of conventional carburetors allow a certain volume of air to enter the carburetor in a given amount of time. The volumetric flow rate of the carburetor can limit how much fuel can be mixed with the air entering the cylinders, and how much power the engine will produce. Air scoops and cowl intakes located by the windshield help direct compressed air into the carburetor when the vehicle is moving. Compressed air increases the amount of air entering the carburetor. More air means more fuel can be mixed with that air, which allows the engine to produce more power. Still, air scoops and cowl intakes only go so far to increase air flow into a carburetor.

Turbochargers and superchargers are frequently added to increase airflow into a carburetor. These devices typical compress air from about 14.7 psi to about 22 psi to provide about 50 percent more air into the engine. Yet, these devices are frequently inappropriate. They are expensive and prone to braking. In addition, while cowl intakes or air scoops are permitted for many racing events, turbochargers and superchargers are not.

The present invention is intended to solve these and other problems.

BRIEF DESCRIPTION OF THE INVENTION

The present invention pertains to an air intake housing and flow enhancing plate for a carburetor. The plate has a fluted and contoured air intake opening that flushly aligns with and matches the shape of the carburetor air intake opening. The low profile plate is made of metal for durability and heat resistance. The centrally located air intake opening of the plate has a clover leaf or undulating shape that conforms to the shape of the carburetor air intake opening. The plate is secured directly over the top of the carburetor, and extends radially outward to provide a larger area for securing its fiberglass housing. The housing holds a conventional ring shaped air filter located around the carburetor air intake opening. The plate provides smooth transitions between surfaces to decrease turbulence and improve air flow.

An advantage of the present carburetor air intake plate is its increased volumetric air flow to the carburetor. This increase in flow rate is believed to be a result of the shape of the plate, which eliminates surface discontinuities along the air flow path of travel. In particular, the rounded or fluted and contoured shape of its air intake opening flushly mates with the carburetor air intake opening to reduce turbulence and increase the volumetric flow rate into the carburetor. The following test results were achieved, and dynamometer testing confirmed these results.

| 20" water column w/90% flow Using 3½" tall air filter | |
|---|---|
| Present housing and air flow enhancing plate | 717 CFM |
| Conventional housing and securement plate A | 720 CFM |
| Conventional housing and securement plate B | 714 CFM |

| 20" water column w/90% flow Using 3" tall air filter (common for most applications) | |
|---|---|
| Present housing and air flow enhancing plate | 718 CFM |
| Conventional housing and securement plate A | 711 CFM |
| Conventional housing and securement plate B | 704 CFM |

| 40" water column w/90% flow (representing a motor with more horsepower) Using 3" tall air filter | |
|---|---|
| Present housing and air flow enhancing plate | 927 CFM |
| Conventional housing and securement plate A | 912 CFM |
| Conventional housing and securement plate B | 910 CFM |

Another advantage of the present plate is that the increase in the volumetric air flow rate increases the amount of fuel that can be mixed with the air entering the cylinders without creating too rich a fuel mixture. The extra fuel increases the power the engine produces, which is particularly important in race car applications. An engine equipped with the present housing and air flow enhancing plate design produces about 5 to 8 horsepower more than if it were using a conventional housing and securement plate design.

A further advantage of the present plate is the flush coplanar alignment of its inner perimeter and air intake opening with the sidewall of the contoured carburetor air intake opening. The structure of this contoured inner perimeter of the plate as well as its fluted upper end and flat lower end are readily machined with a three axis (3-axis) milling machine. The inner perimeter of the plate is thicker than the radius of the rounding or fluting of the plate along its upper surface, which creates a flat region proximal the bottom surface of the plate. This flat region is contoured to flushly align in coplanar registry with the sidewall forming the contoured carburetor air intake opening. The fluting and flush, contoured, coplanar alignment of the inner perimeter of the plate with the contoured carburetor air intake opening.

A still further advantage of the present air intake plate is its low profile and radial structure. The low profile design allows it to fit beneath the hood of a car with no or minimal modification to the car hood. The radial structure allows the plate to fit centrally over the top of the carburetor, which allows for use with conventional ring shaped air filters. The centrally located and radially shaped plate allows the weight of the plate, filter and housing to be evenly distributed around the plate and carburetor.

A still further advantage of the present carburetor air intake plate is its ability to accommodate its use with an air scoop or induction cowl intake duct. In this way, the plate facilitates compression of the air prior to entering the carburetor, which further increases the amount of fuel that can be mixed with the air. This design further increases the power of the engine, which is particularly important for racing applications.

A still further advantage of the present carburetor air intake plate invention is its ease of installation. The lower surface of the plate is shaped to fit over the top of a conventional carburetor. A circular rib extending from the plate provides a socket to snuggly secure the plate around the perimeter of the carburetor. A conventional wing nut is used to secure the plate and housing in place. An air intake housing or scoop is easily secured to the plate via screws and uniformly spaced slots around the perimeter of the plate. This allows the plate or the entire housing to be easily and quickly installed and removed, which is particularly important for racing applications.

Other aspects and advantages of the invention will become apparent upon making reference to the specification, claims and drawings.

DESCRIPTION OF THE PREFERRED EMBODIMENTS

While this invention is susceptible of embodiment in many different forms, the drawings show and the specification describes in detail a preferred embodiment of the invention. It should be understood that the drawings and specification are to be considered an exemplification of the principles of the invention. They are not intended to limit the broad aspects of the invention to the embodiment illustrated.

Figure 1A:
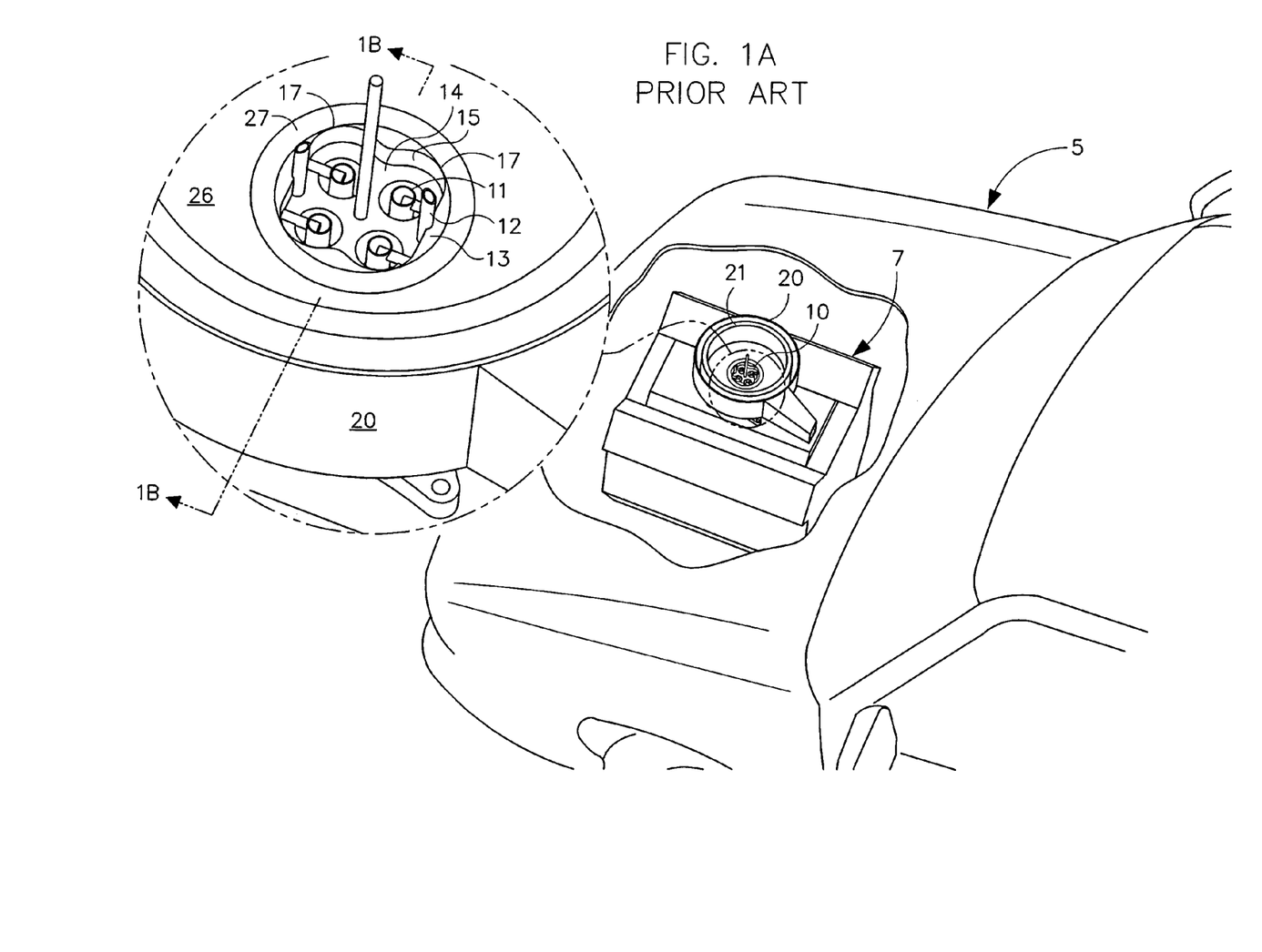
FIG. 1A is a perspective view of a vehicle with an internal combustion engine having a four barrel carburetor, and equipped with a conventional air filter and intake housing and securement plate, and showing an enlargement of the plate secured to the carburetor and the contoured hourglass shape of the carburetor air intake opening.
Figure 1B:
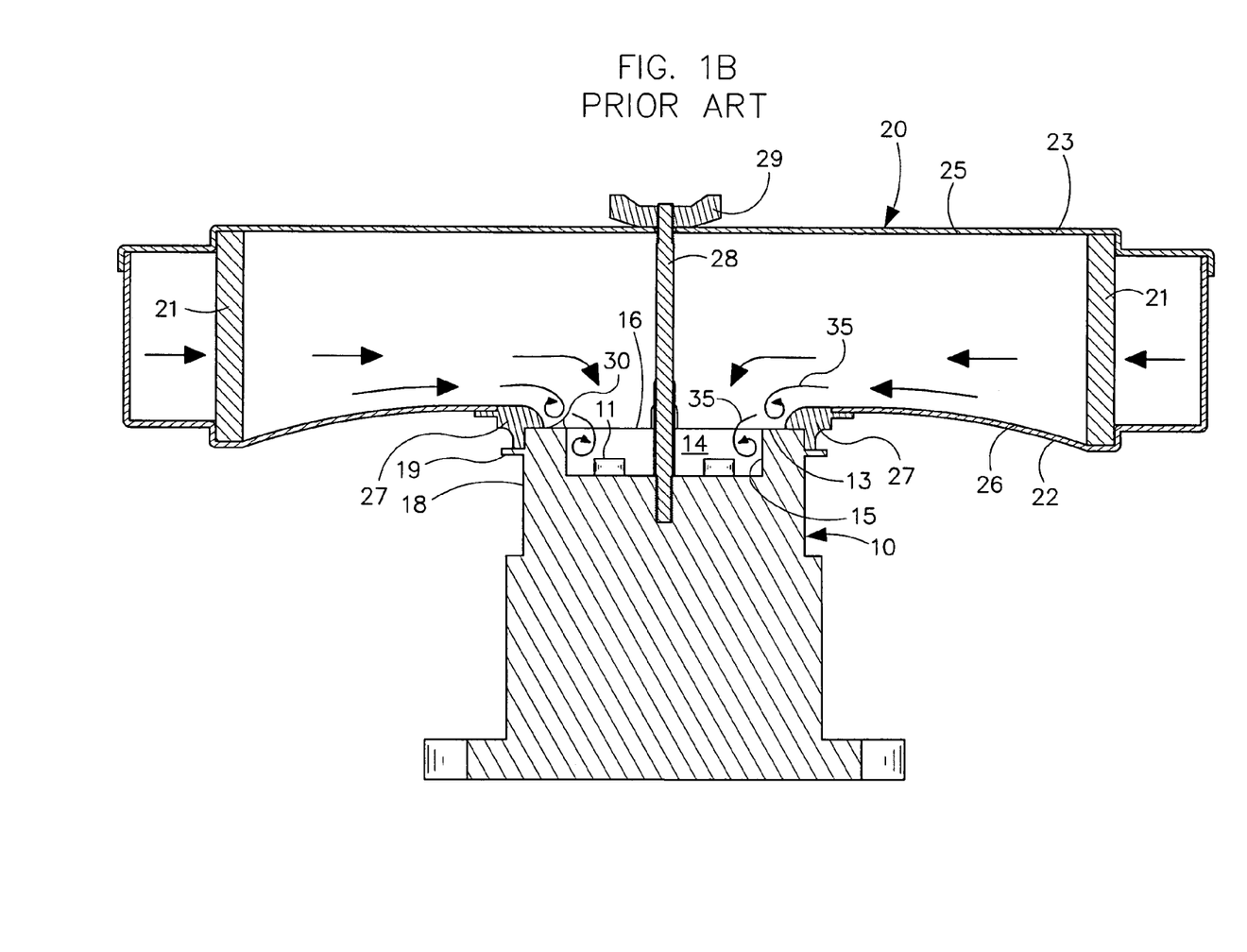
FIG. 1B is a cross-sectional view of FIG. 1A showing the conventional securement plate secured to the carburetor with its rounded inner perimeter extending over the top of the carburetor, and showing surface discontinuities that disrupt the flow of air along its path of travel.
Figure 2:
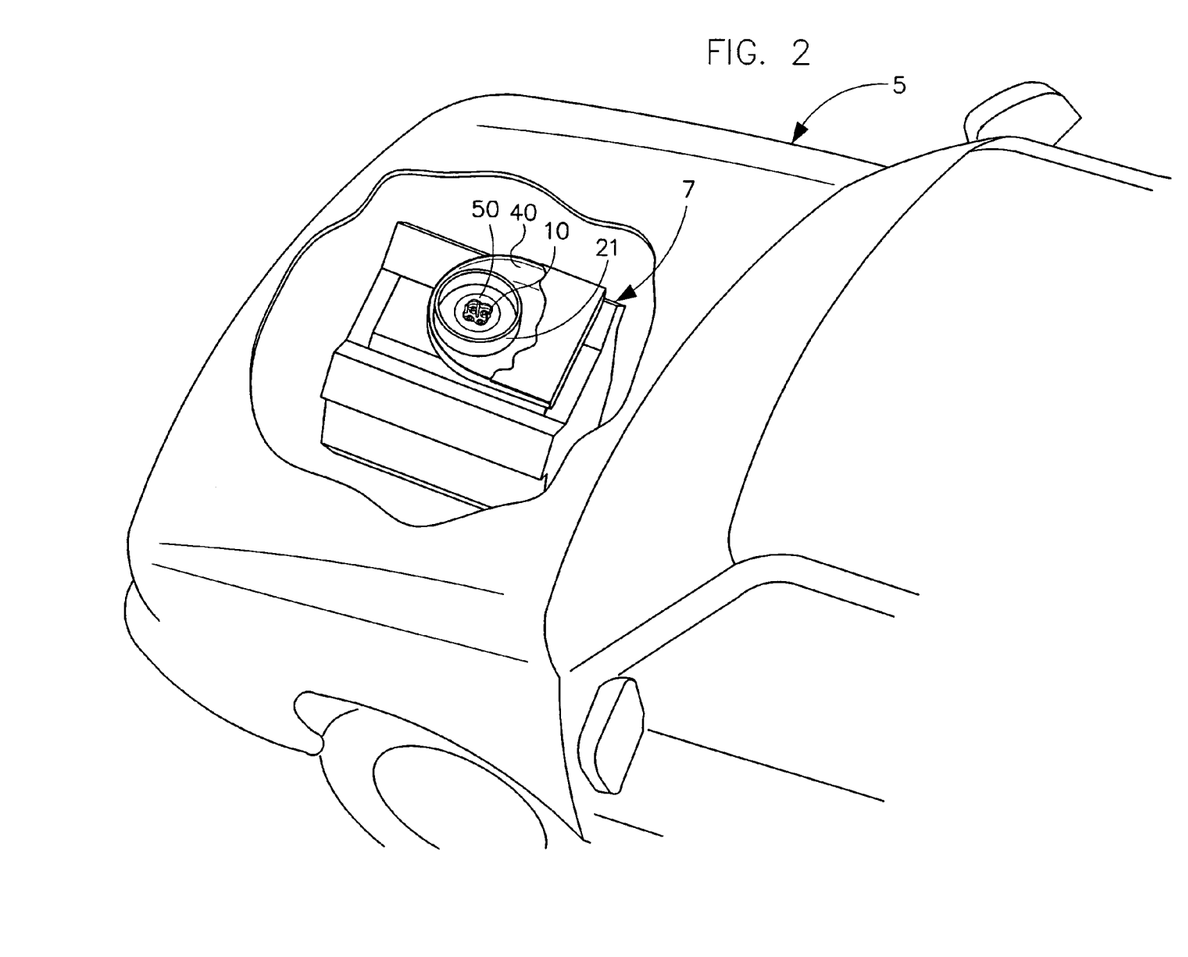
FIG. 2 is a perspective view of a vehicle with an internal combustion engine having a four barrel carburetor equipped with the inventive housing and air flow enhancing plate.
Figure 3:
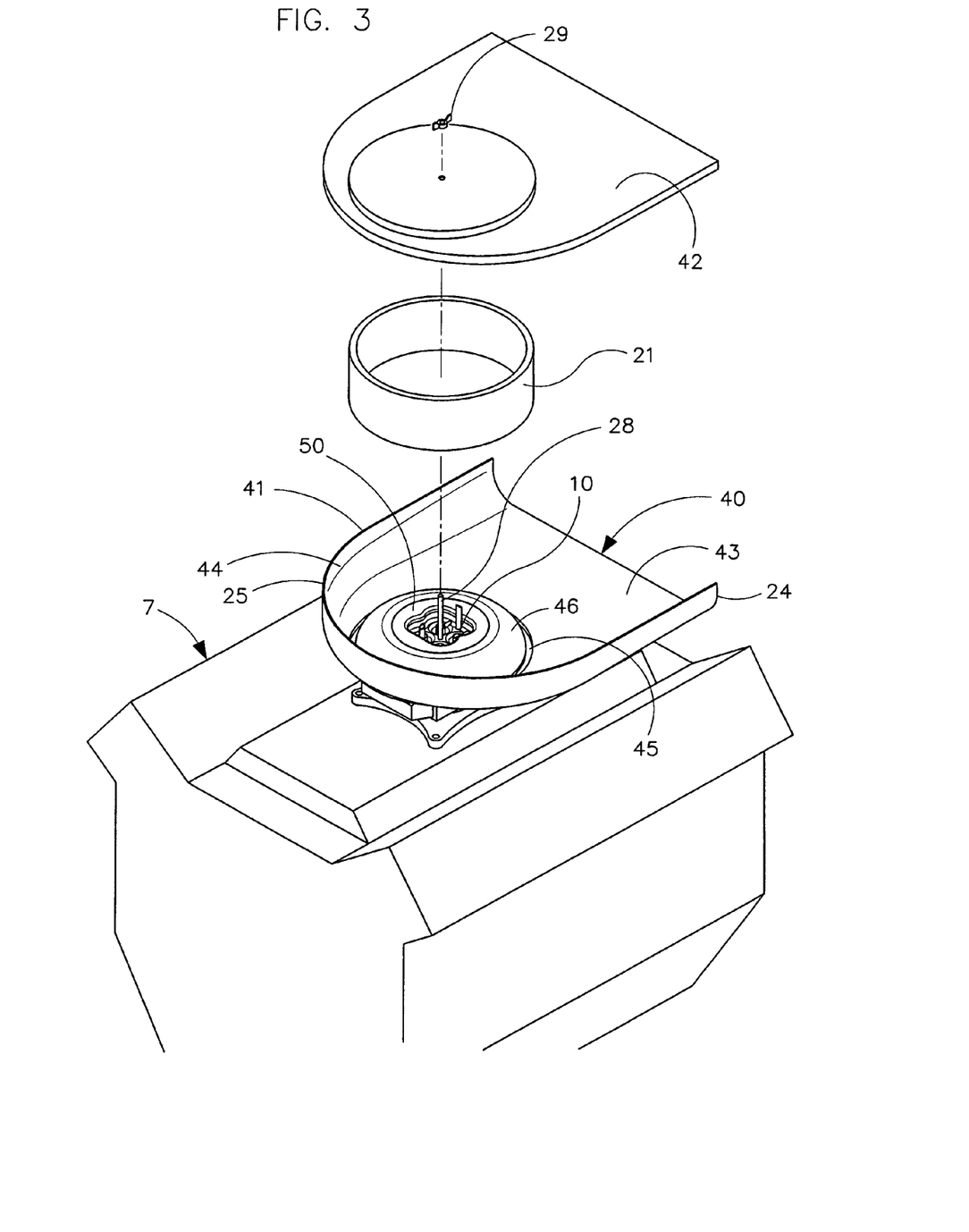
FIG. 3 is a perspective view of an internal combustion engine having a four barrel carburetor equipped with the inventive housing and air flow enhancing plate.
Figure 4:
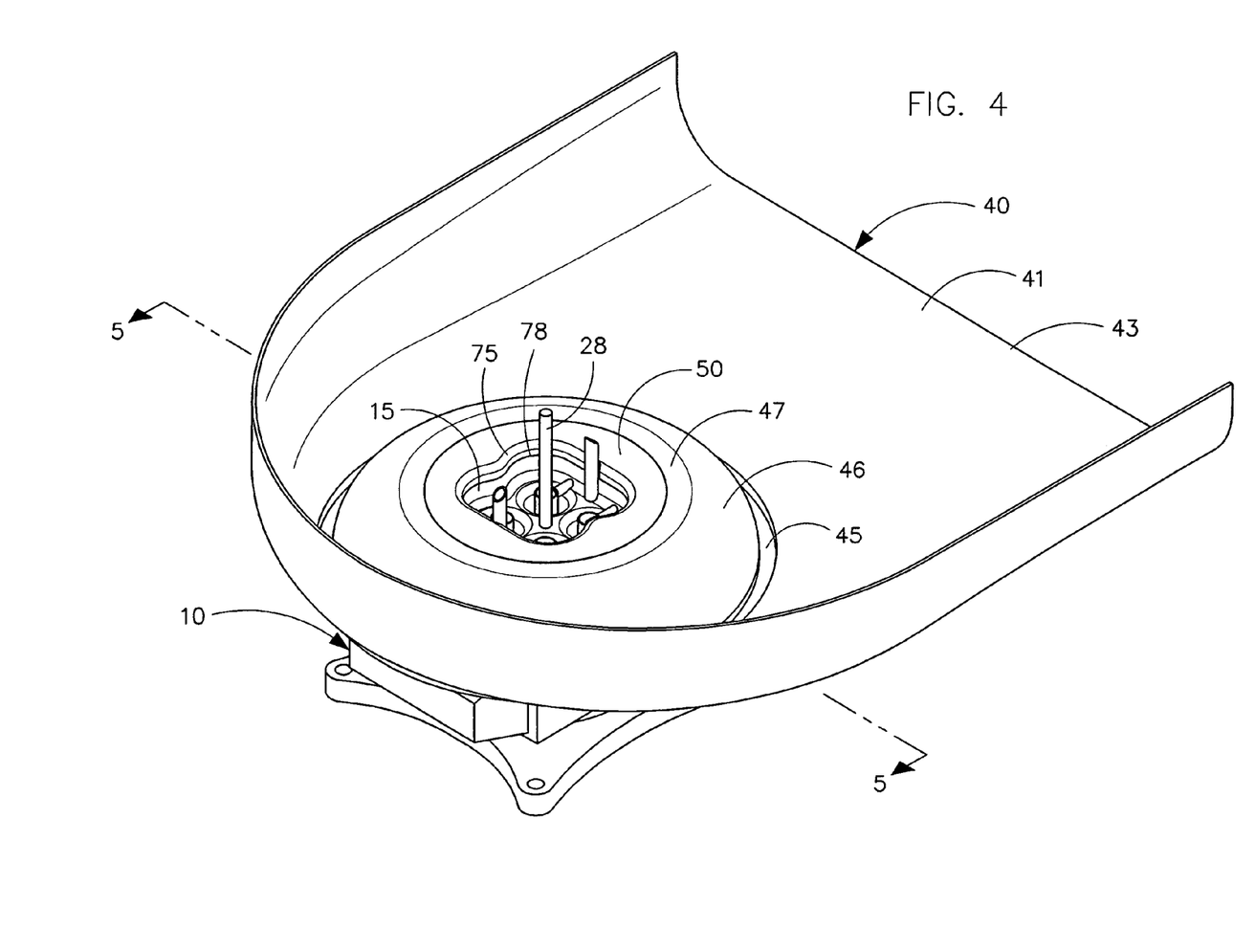
FIG. 4 is a perspective view of the present inventive housing and air flow enhancing plate mounted over the top of a four barrel carburetor.

Conventional vehicles 5 with internal combustion engines 7 use carburetors 10 to mix liquid fuel with outside air as shown in FIGS. 1A and 1B. The resulting vaporized air-fuel mixture is sent to the cylinders of the engine 7 to ignite and power the vehicle 5. Carburetors 10 typically have two or four fuel and air mixing barrels 11 and two overflow tubes 12. The carburetor 10 has a generally flat, horizontal top surface 13 with a centrally located, hourglass or clover leaf shaped air-fuel mixing chamber 14. The continuous arcuate sidewall or throat 15 of the chamber 14 is generally vertical or perpendicular to its top surface 13 to form an edge that creates an air flow disruption or discontinuity. The barrels 11 are symmetrically located inside the hourglass or clover leaf shaped chamber 14 when viewed from above. One barrel 11 is located in each leave of the chamber 14. The contoured air inlet opening 16 allows air to flow down into the barrels 11 of the carburetor 10. The hourglass shape of the opening 16 has four outermost points 17. The top surface 13 of the carburetor 10 forms a flat upper rim around its mixing chamber 14. The perimeter of this rim 13 is formed by the round outer sidewall surface 18 of the carburetor 10. A lip 19 extends radially out from the side surface 18 to support an air intake and filter housing.

Carburetors 10 are provided with an air intake and filter housing 20 that holds a conventions ring shaped air filter 21 to filter the outside air before it enters the centrally located carburetor 10. Racecars and other high performance vehicles typically use an air intake housing or air scoop to take in higher pressure or compressed air produced by the movement of the car 5. The housing 20 has lower and upper mating shell portions 22 and 23 made of fiberglass. The housing 20 forms a free or open end 24 for taking in air and a carburetor end 25 with a domed portion 26 that holds the air filter 21. The lower portion 22 of the housing 20 includes a metal securement plate 27 that is fastened to the fiberglass housing.

The metal plate 27 has a downwardly extending shoulder and round central opening. The shoulder is sized and shaped to fit around the outside wall 18 of the carburetor 10 and rest on its radially extending flange 19. The shoulder includes a gasket (not shown) to help form an air tight seal. The plate 27 extends over the top 13 of the carburetor 10, and its round central opening is sized so that the plates rounded end forming the opening intersects the four outermost points 17 of the hourglass shape of the contoured carburetor air intake opening 16 as shown in the enlarged view of FIG. 1A. The remainder and majority of the plate terminates short of the opening 16 to create edged shelve surfaces or discontinuities 30 that disrupt the air flow as shown in FIG. 1B. These surface discontinuities 30 along the air flow path between the housing 20 and carburetor 10 disrupt the air flow 29, and create a more turbulent air flow 35. A center bolt 28 and wing nut 29 hold the fiberglass housing 20 and metal plate 29 in place against the top 13 of the carburetor 10.

The present invention pertains to an air intake housing and its securement and air flow enhancing plate shown generally by reference numbers 40 and 50, respectively, as shown in FIGS. 2-10. The air intake housing 40 is formed by upper and lower duct portions 41 and 42. The housing 40 has an open or free end 43 for taking in outside air, and a carburetor end 44 for securing to the top of the carburetor 10. The carburetor end 44 has a slot 45 for holding a conventional ring shaped air filter 21. This end 44 also has a rounded domed portion 46 to lower the housing 40 inside the engine compartment of the car 5. The domed portion 46 includes a flat, horizontal radial flange 47 with uniformly spaced securement slots. The inner or free end of the flange 47 forms a round central opening 49 having a diameter of about seven inches.

The securement and air flow enhancing plate 50 has a generally disc shape to give it a low profile to minimize the height of the air intake housing 40 relative to the engine 7. The plate 50 has a wedge shaped main body 51 with lower and upper surfaces 52 and 53. A flat outer rim 55 extends radially from the main body 51. The flat rim 55 is located between its outer edge or perimeter 56 and a lip 57 located proximal the main body 51. Slots 58 are formed through the rim 55 at uniform intervals to allow screws (not shown) to secure the plate 50 to the flange 47 of the housing 40. The plate 50 is inserted into housing opening 49 and secured along flange 47 via these screw fasteners.

The lower surface 52 of the plate 50 includes a downwardly extending rib 61 with a lower end 62 that forms a mounting socket 65 sized and shaped to receive the sidewall 18 and top 13 of the carburetor 10. The lower end 62 of the rib 61 abuts the radial flange 19, and the lower surface 52 of the plate 50 rests on the top surface 13 of the carburetor 10. The center bolt 28 and wing nut 29 hold the housing 40 and metal plate 50 in place. A gasket can be used to help form an air tight seal.

Figure 9:
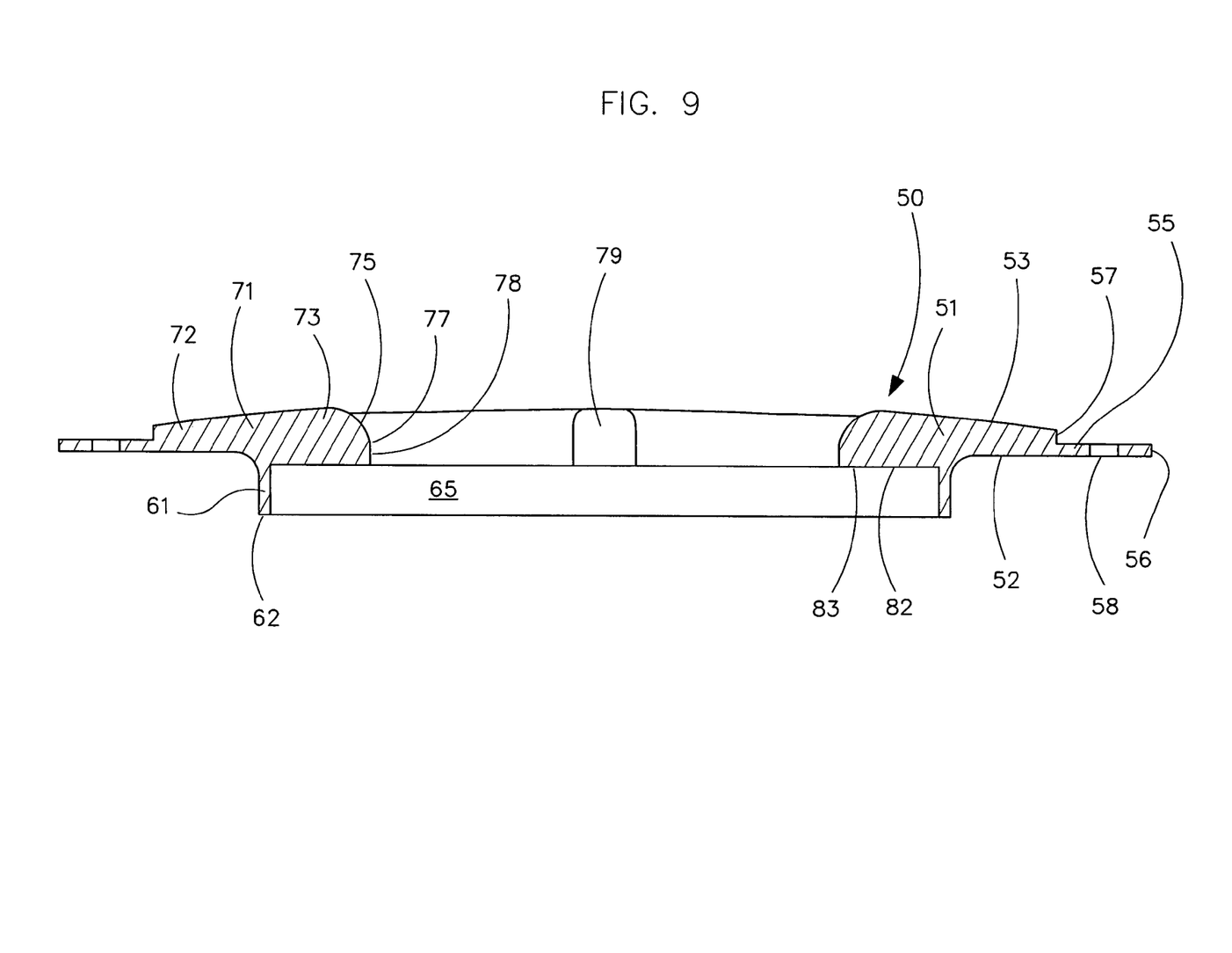
FIG. 9 is a cross-sectional view of FIG. 7 taken along line 9-9 showing the shape of the main body of the securement and air flow enhancing plate, its fluted and contoured air intake opening, its lower carburetor mounting rib and its radial flange for securing its housing.

The main body 51 has a wedge shaped or inclined portion 71 with a thinner outer portion 72 of about 0.2 inches, and a thicker inner portion 73 of about 0.7 inches as best shown in FIG. 9. The upper surface 53 of the inclined portion 71 slopes radially downward toward its outer perimeter to help maintain its low profile. The thicker inner portion 73 has a smoothly curved transitional or rounded portion 75 that culminates at its inner perimeter 77. The machined rounded portion 75 has a constant radius of preferably about ½ inch curvature. This rounding radius remains constant around the entire inner perimeter 77 of the plate 50, and leaves a vertical flat region 78 of about ¼ inch around the inner perimeter 77. Notches 79 are formed on opposite sides of the inner perimeter 77 to accommodate the overflow tubes 12 of the carburetor.

Figure 5:
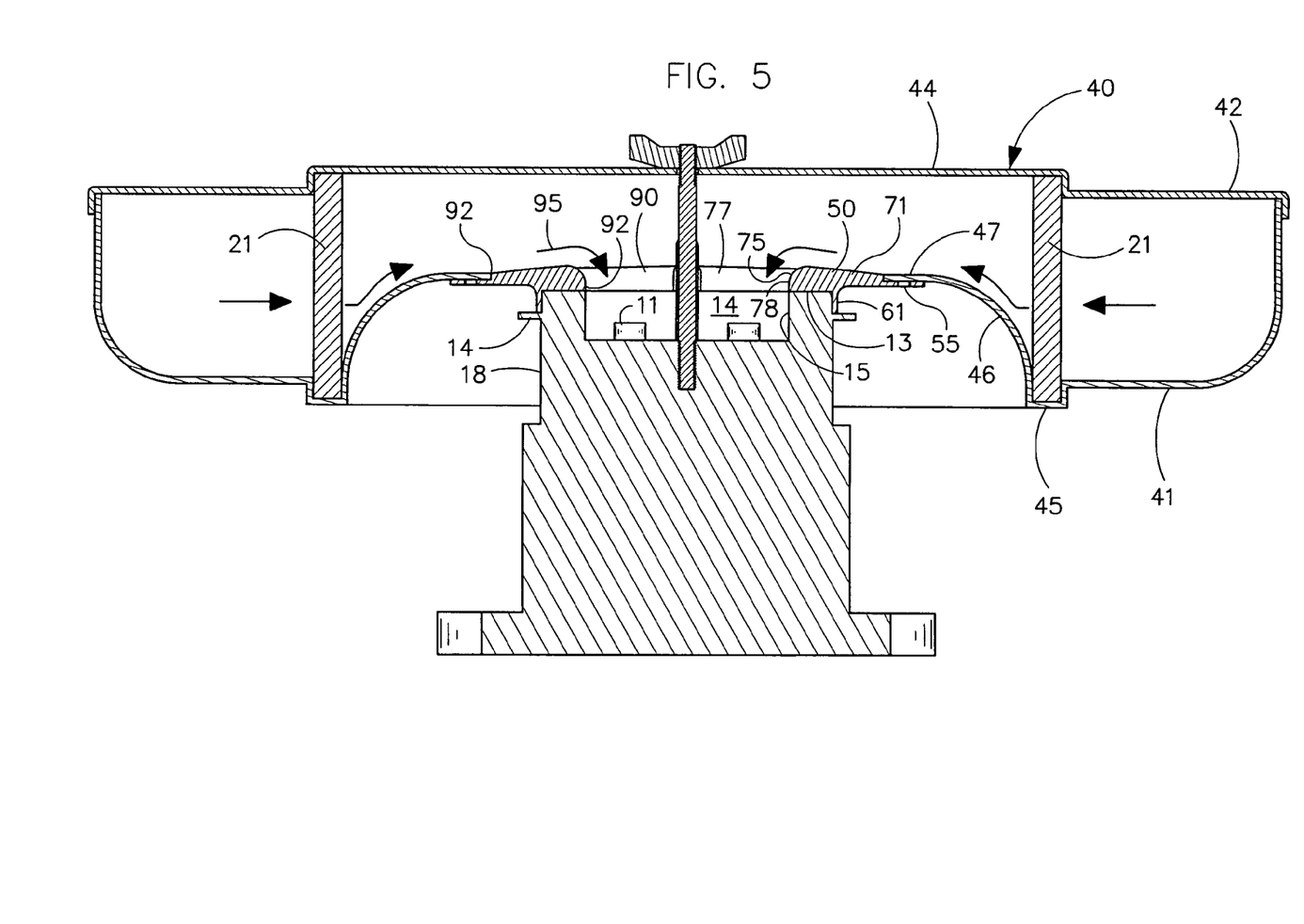
FIG. 5 is a cross-sectional view of FIG. 4 taken along line 5-5 showing the flow enhancing plate mounted over the top of the carburetor and the air intake and filter housing secured to the radial perimeter of the plate, with the plate forming smooth transitions between surfaces along the air flow path of travel.
Figure 6:
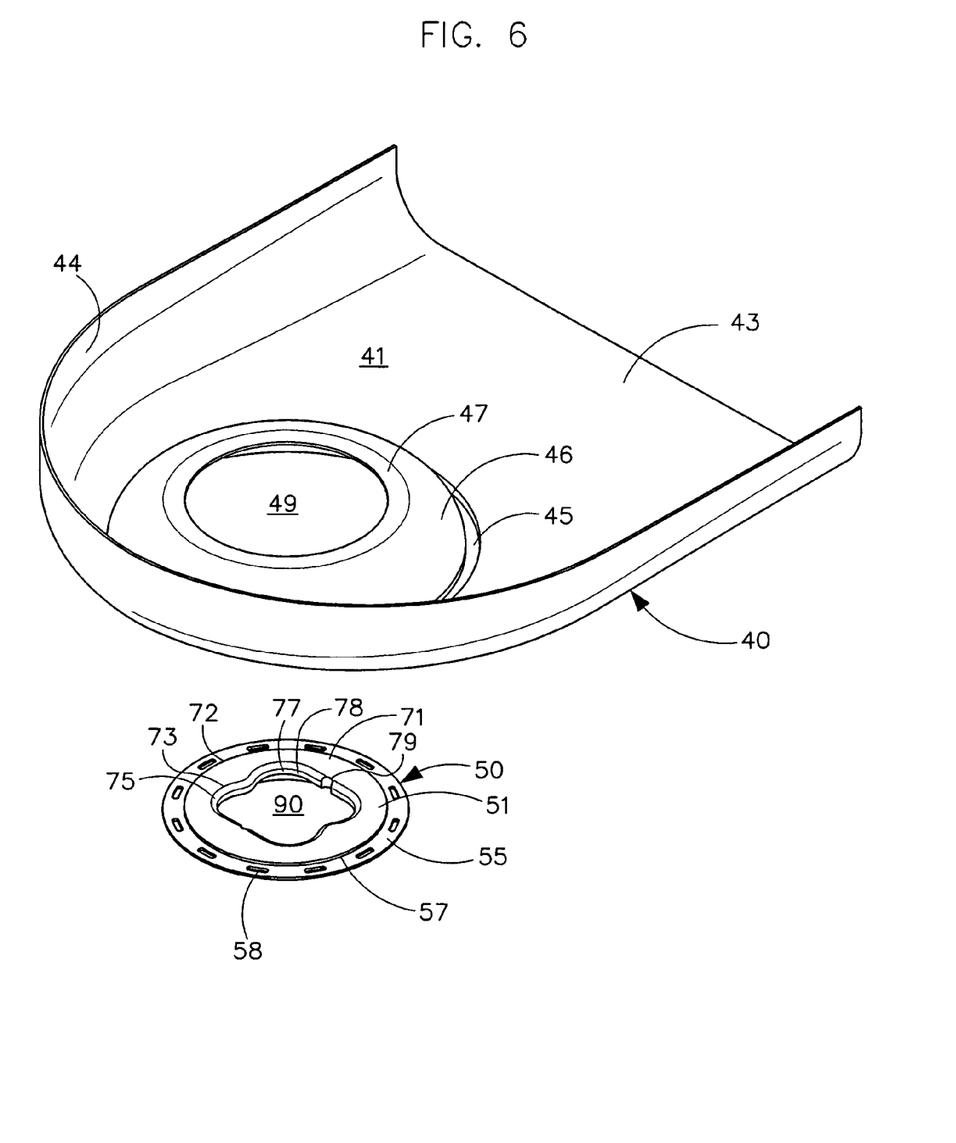
FIG. 6 is an exploded view of the housing and air flow enhancing plate.
Figure 7:
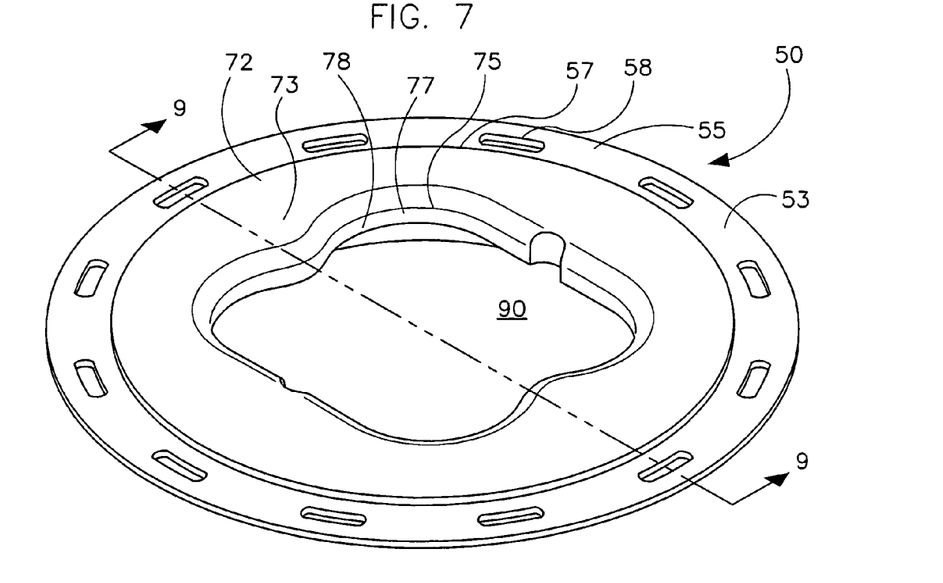
FIG. 7 is an enlarged, top perspective view of the securement and air flow enhancing plate and its fluted and contoured air intake opening.
Figure 8:
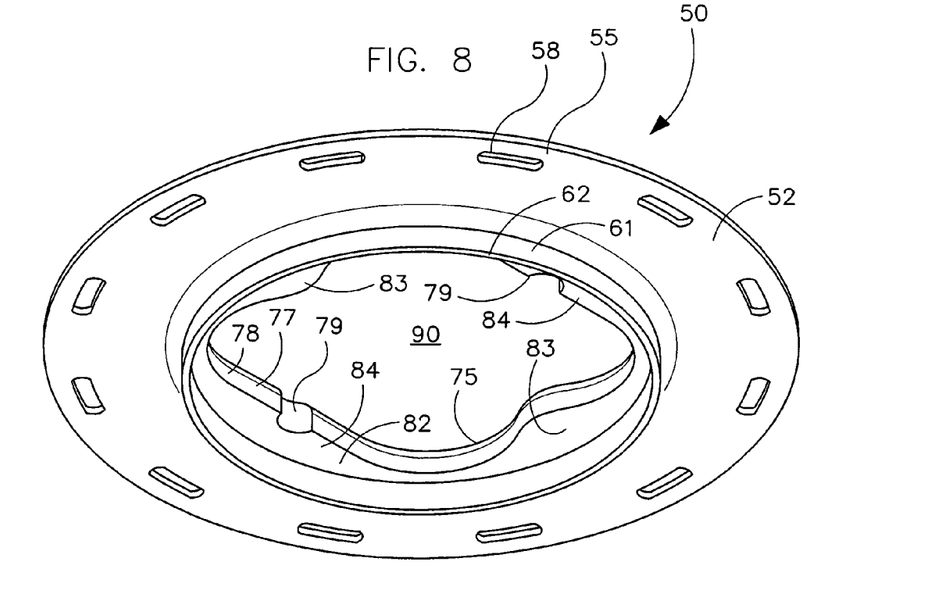
FIG. 8 is an enlarged, bottom perspective view of the securement and air flow enhancing plate and its fluted and contoured air intake opening, as well as the sleeve flange for securing the plate to the top of the carburetor.
Figure 10:
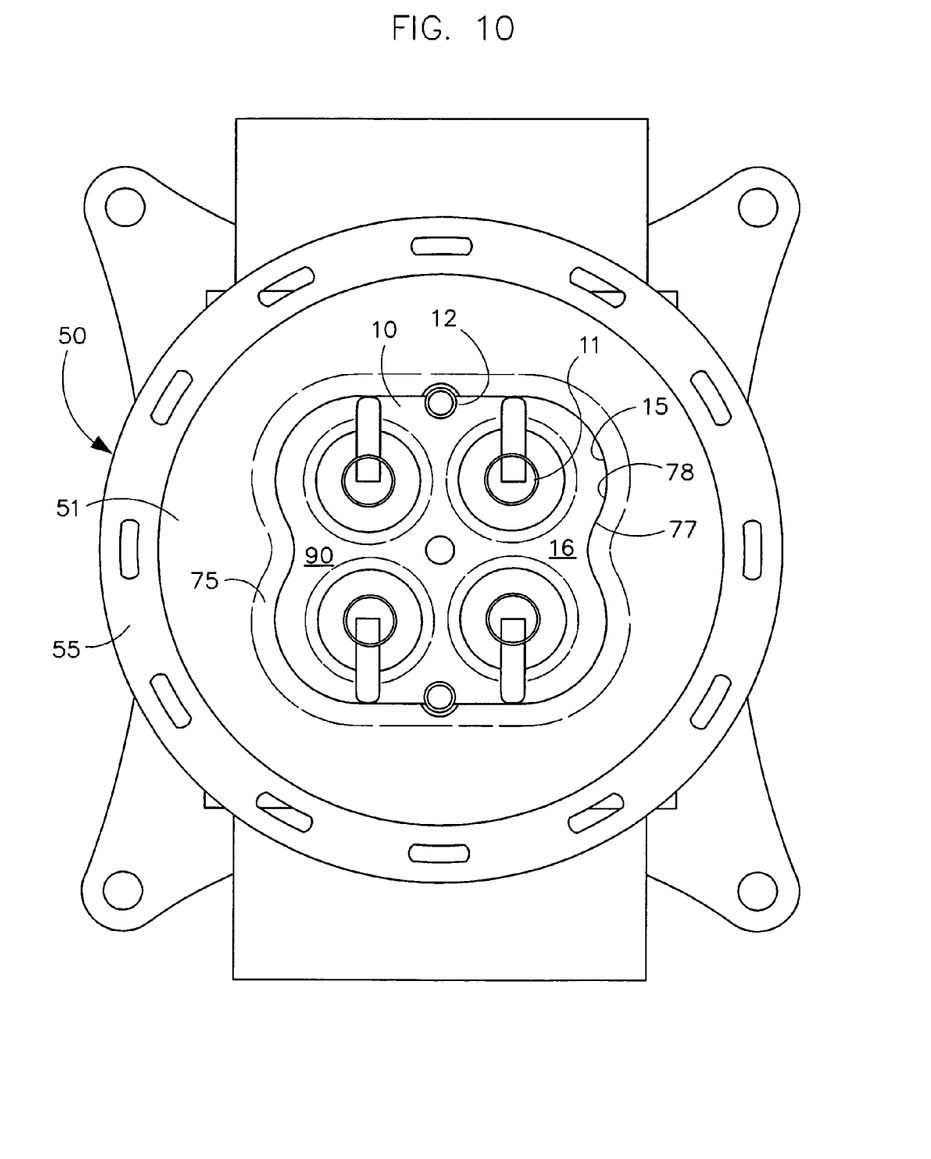
FIG. 10 is a top view of the air flow enhancing plate secured over the top of a four barrel carburetor showing its central alignment with the carburetor and the flush alignment of the contoured air intake openings of the plate and carburetor.

The inner perimeter 77 of the plate 50 is contoured to match the shape of the sidewall 15 of the carburetor chamber 14 as best shown in FIGS. 5, 6 and 10. The perimeter 77 is shaped so that arcuate air intake opening 90 flushly aligns with the arcuate or hourglass shape of the air intake opening 16 of the carburetor 10. The undulating or hourglass shape of opening 90 is flushly aligned with the hourglass shaped opening 16 of the carburetor 10. The flat region 78 of the plate is in flush registered coplanar alignment with the vertical sidewall 15 forming the chamber 14. The plate 50 provides smooth transitions 92 between surfaces and is fluted to decrease turbulence and improve air flow 95 and engine performance.

The undulating nature of the inner perimeter 77 of the plate 50 provides inner contoured areas 82 of the plate 50 that extend inside the outermost points 17 of the hourglass shaped carburetor opening or throat 16. These contoured areas 82 avoid the shelving effect and formation of discontinuities found in conventional plate designs. The hourglass or undulating shape of the perimeter 77 produces alternating wider 83 and narrower 84 contoured areas 82 that extend inwardly of the outermost points 17 of the hourglass shaped carburetor air intake opening 16. The flat lower surfaces 52 of these areas 82 rest on the top surface 13 of the carburetor 10. The round outer perimeter 56 and an arcuate inner perimeter 77 of the plate 50 give it a somewhat ring-like disc or donut shape.

While the invention has been described with reference to a preferred embodiment, it will be understood by those skilled in the art that various changes may be made and equivalents may be substituted without departing from the broader aspects of the invention.

We claim:

1. An air flow enhancing plate for a carburetor, the carburetor having an outer wall, a flat top surface and a contoured carburetor air intake opening extending down from its top surface to form a throat with a sidewall substantially normal to its top surface, the carburetor air intake opening having an hourglass shape with four outermost points, and said air flow enhancing plate comprising:
   a main body with spaced upper and lower surfaces and a contoured inner plate opening formed by a contoured inner perimeter of said plate, said plate opening having an hourglass shape, said plate extending over the top surface of the carburetor and having inner contoured areas extending inward of the four outermost points of the hourglass shaped carburetor opening, said hourglass shape of said plate opening being sized and shaped to flushly align with said contoured hourglass shape of the carburetor air intake opening, and said upper surface of said inner perimeter being rounded to form a fluted plate opening;
   a securing rib extending from said main body, said rib being sized and shaped to snuggly receive the outer wall of the carburetor to join said plate to the top of the carburetor; and,
   wherein said hourglass shaped plate opening is adapted for aligned registry with the hourglass shaped carburetor air intake openings with said contoured inner perimeter of said lower surface of said plate being adapted for flush alignment with the sidewall of the contoured carburetor air intake opening, said fluted plate opening and said flush alignment improving air flow into the throat of the carburetor.

2. The air flow enhancing plate of claim 1, and wherein said inner perimeter of said plate has a predetermined thickness and said rounded upper surface has a constant radius of less than said predetermined thickness to form a flat region in said inner perimeter of said plate proximal its said lower surface, said flat region being adapted for coplanar alignment with the side wall of the carburetor.

3. The air flow enhancing plate of claim 2, and wherein said inner perimeter of said plate has a thickness of about ¾ inch and said rounded upper surface has a constant radius of about ½ inch.

4. The air flow enhancing plate of claim 2, and wherein said plate is disc shaped and its said main body has a wedge shaped cross sectional shape with said inner perimeter of said main body being thicker than said outer end of said main body.

5. The air flow enhancing plate of claim 4, and wherein said inner perimeter of said main body has a thickness of about ¾ inch and said outer end of said main body has a thickness of about ¼ inch.

6. The air flow enhancing plate of claim 1, and wherein said main body of said plate has a radial outer flange for securing to an air intake housing, said air intake housing having a circular flange that defines a plate securement opening, said radial outer flange overlapping said circular flange when said plate is secured to said housing, and said air intake housing holds a ring shaped air filter that surrounds said plate and plate opening.

7. The air flow enhancing plate of claim 1, and wherein said lower surface of said plate rests on the top surface of the carburetor.

8. The air flow enhancing plate of claim 7, and wherein said lower surface of said plate flushly engages the top surface of the carburetor.

9. The air flow enhancing plate of claim 7, and wherein said securing rib rests on a radial side flange of the carburetor.

10. The air flow enhancing plate of claim 9, and wherein said lower surface of said plate and said securing rib form a socket for securing said plate over the top of the carburetor.

11. An air intake housing and securement and air flow enhancing plate for delivering outside air to a carburetor after the outside air passes through an air filter, the carburetor having an outer wall, a flat top surface and a contoured carburetor air intake opening extending down from its top surface to form a throat with a sidewall substantially normal to its top surface, the carburetor air intake opening having an hourglass shape with four outermost points, and said air intake housing and securement and air flow enhancing plate comprising:

an air intake housing having an air intake end and a carburetor end, said air intake end being open to receive the outside air, said carburetor end being adapted to receive the air filter and having an opening downstream of the air filter, said downstream opening being formed by a plate securing flange;

an air flow enhancing plate having a main body with spaced upper and lower surfaces and a contoured inner plate opening formed by a contoured inner perimeter of said plate, said plate opening having an hourglass shape, said plate extending over the top surface of the carburetor and having inner contoured areas extending inward of the four outermost points of the hourglass shaped carburetor opening, said hourglass shape of said plate opening being sized and shaped to flushly align with said contoured hourglass shape of the carburetor air intake opening, and said upper surface of said inner perimeter being rounded to form a fluted plate opening, said plate including a securing rib extending from said main body, said rib being sized and shaped to snuggly receive the outer wall of the carburetor to join said plate to the top of the carburetor; and, wherein said hourglass shaped plate opening is adapted for aligned registry with the hourglass shaped carburetor air intake openings with said contoured inner perimeter of said lower surface of said plate being adapted for flush alignment with the sidewall of the contoured carburetor air intake opening, said fluted plate opening and said flush alignment improving air flow into the throat of the carburetor.

12. The air flow enhancing plate of claim 11, and wherein said inner perimeter of said plate has a predetermined thickness and said rounded upper surface has a constant radius of less than said predetermined thickness to form a flat region in said inner perimeter of said plate proximal its said lower surface, said flat region being adapted for coplanar alignment with the side wall of the carburetor.

13. The air flow enhancing plate of claim 12, and wherein said inner perimeter of said plate has a thickness of about ¾ inch and said rounded upper surface has a constant radius of about ½ inch.

14. The air flow enhancing plate of claim 12, and wherein said plate is disc shaped and its said main body has a wedge shaped cross sectional shape with said inner perimeter of said main body being thicker than said outer end of said main body.

15. The air flow enhancing plate of claim 14, and wherein said inner perimeter of said main body has a thickness of about ¾ inch and said outer end of said main body has a thickness of about ¼ inch.

\* \* \* \* \*